US008074175B2

(12) United States Patent
Brush et al.

(10) Patent No.: US 8,074,175 B2
(45) Date of Patent: Dec. 6, 2011

(54) USER INTERFACE FOR AN INKABLE FAMILY CALENDAR

(75) Inventors: Alice Jane Bernheim Brush, Bellevue, WA (US); Carman G. Neustaedter, Calgary (CA)

(73) Assignee: Microsoft Corporation, Redmond, WA (US)

( * ) Notice: Subject to any disclaimer, the term of this patent is extended or adjusted under 35 U.S.C. 154(b) by 379 days.

(21) Appl. No.: 11/359,855

(22) Filed: Feb. 22, 2006

(65) Prior Publication Data

US 2007/0168892 A1 Jul. 19, 2007

Related U.S. Application Data

(60) Provisional application No. 60/756,775, filed on Jan. 6, 2006.

(51) Int. Cl.
*G06F 3/00* (2006.01)
(52) U.S. Cl. .......................... 715/751; 715/963
(58) Field of Classification Search .................. 715/751, 715/963; 15/751, 963
See application file for complete search history.

(56) References Cited

U.S. PATENT DOCUMENTS

| | | | | |
|---|---|---|---|---|
| 5,936,625 | A * | 8/1999 | Kahl et al. | 715/775 |
| 6,018,343 | A * | 1/2000 | Wang et al. | 715/733 |
| 6,034,683 | A * | 3/2000 | Mansour et al. | 715/764 |
| 6,085,166 | A * | 7/2000 | Beckhardt et al. | 705/9 |
| 6,101,480 | A * | 8/2000 | Conmy et al. | 705/9 |
| 6,603,489 | B1 * | 8/2003 | Edlund et al. | 715/780 |
| 7,069,234 | B1 * | 6/2006 | Cornelius et al. | 705/26 |
| 7,111,251 | B2 * | 9/2006 | Komai | 715/844 |
| 7,181,689 | B2 * | 2/2007 | Mock et al. | 715/703 |
| 7,383,291 | B2 * | 6/2008 | Guiheneuf et al. | 707/203 |
| 2002/0063732 | A1 * | 5/2002 | Mansikkaniemi et al. | 345/733 |
| 2002/0196280 | A1 * | 12/2002 | Bassett et al. | 345/751 |
| 2004/0268270 | A1 * | 12/2004 | Hill et al. | 715/963 |
| 2005/0039142 | A1 * | 2/2005 | Jalon et al. | 715/823 |
| 2005/0091578 | A1 * | 4/2005 | Madan et al. | 715/512 |
| 2005/0222971 | A1 * | 10/2005 | Cary | 707/1 |
| 2005/0262164 | A1 * | 11/2005 | Guiheneuf et al. | 707/203 |
| 2006/0242581 | A1 * | 10/2006 | Manion et al. | 715/733 |

OTHER PUBLICATIONS

MediaBee™, http://web.archive.org/web/20041229074003/mediabee.com/products/tour/index.html, Dec. 29, 2004.*
Beech, et al. "The Lifestyles of Working Parents" (2004) Report HPL-88R1, HP Labs, 114 pages.
Brush, et al. "A Survey of Personal and Hosehold Scheduling" (2005) pp. 330-331.
Crabtree, et al. "Finding a Place UbiComp in the House" (2003) Proc Ubicomp, pp. 208-226.
Crabtree, et al. "Informing the Development of Calendar Systems for Domestic Use" (2003) Proc ECSCW, 21 pages.
Dourish. "Where the Action is: The Foundation of Embodied Interaction" (2001) MIT Press, 4 pages.

(Continued)

*Primary Examiner* — Ashraf Zahr
(74) *Attorney, Agent, or Firm* — Lee & Hayes, PLLC

(57) ABSTRACT

The subject application relates to a user interface(s), system(s), and/or methodology that facilitate improved management and coordination of activities, events, and occasions using a digital calendar format that can be accessed anywhere, changed or edited with ease, and readily synchronized on different devices. Various input modes can be employed including inking. New items can be created using an inking component and then dragged and dropped onto the appropriate day. Items can be modified or deleted and such alterations can be tracked to ensure that calendar changes can be monitored, and moreover, access to the calendar can be controlled.

19 Claims, 15 Drawing Sheets

OTHER PUBLICATIONS

Edwards, et al. "At Home with Ubiquitous Computing: Seven Challenges" (2001), pp. 256-272.

Elliot, et al. "Time, Ownership and Awareness: The Value of Contextual Locations in the Home" (2005) Proc Ubicomp, 18 pages.

Family Scheduler Members Login http://www.familyscheduleronline.com/ last viewed Mar. 16, 2006, 1 page.

Hutchinson, et al. "Family Calendar Survey" (2002) Report CS-TR-4412 Department of Computer Science, university of Maryland, 3 pages.

Our Family Wizard http://www.ourfamilywizard.com/index.cfm last viewed Mar. 16, 2006.

Neustaedter, et al. "Where Are You and When Are You Coming Home? Foundations of Interpersonal Awareness" (2005) GroupLab Working Paper, 11 pages.

Norman. "The Invisible Computer" (1998) Cambridge, MAMIT Press, pp. 51-68.

Palen. "Social, Individual & Technological Issues for Groupware Calendar Systems" (1999) Proc CHI, ACM Press, pp. 17-24.

Plaisant, et al. "Shared Family Calendars: Promoting Symmetry and Accessibility" (2003) Report HCIL-2003-38, Department of Computer Science, University of Maryland, 33 pages.

Sellen, et al. "The Everyday Problems of Working Parents: Implications for New Technologies" (2004) Report HPL-2004-37, HP Labs, 6 pages.

Tam, et al. "A Framework for Asynchronous Change Awareness in Collaboratively-Constructed Documents" International Journal of Human Computer Studies, pp. 67-83.

Taylor, et al. "Artful Systems in the Home" (2005) Proc CHI, ACM Press, pp. 641-650.

Yang, et al. "Experimental Analysis of Mode Switching Techniques in Pen-based User Interfaces" (2005) CHI 2005, ACM Press, pp. 461-470.

* cited by examiner

FIG. 6

USER INTERFACE FOR AN INKABLE FAMILY CALENDAR

CROSS REFERENCE TO RELATED APPLICATION

This application claims the benefit of U.S. Provisional Application Ser. No. 60/756,775, entitled USER INTERFACE FOR AN INKABLE FAMILY CALENDAR and filed on Jan. 6, 2006, the entirety of which is incorporated herein by reference.

BACKGROUND

Everyday family life involves a myriad of mundane activities: for example, recurring soccer games, piano lessons, doctors' appointments, work schedules, relatives' visits, family outings, softball practices, after-school activities, and much more. These events must all be scheduled and coordinated between family members and then re-scheduled if things do not go as planned or conflicts arise. As a result, family life often requires a complex routine for awareness and coordination to manage the everyday activities that constitute work, personal, and familial aspects of life. This notion of family coordination extends beyond the home to also encompass activities while on-the-go or at work. For example, it involves scheduling appointments while at the doctor's office or checking the family calendar at work for evening events.

Despite families using various organization schemes, coordination among family members still remains an everyday problem for many people. Paper calendars are one tool used by families to help stay organized: they are easy to use, personalizable, and create an instant archive of family activities. Yet the downside is paper calendars are not available outside the home or available to more than one family member at a time when one member is at home and one member is away from the home. Thus, sharing paper calendars between multiple family members can be challenging if not impossible most of the time since there is typically only one copy of the paper calendar. Families are limited to keeping the paper calendar centrally located such as in the home which restricts access to it when away from the home.

Some families have turned to conventional electronic calendars as a possible remedy. However, these often take time to open (e.g., computer boot-up time) and may be inconveniently located in one room of the home. Access to these electronic calendars can be difficult too since they may not be readily available once outside the home. Overall, either electronic or paper calendars can be hard to synchronize if multiple calendars are used.

SUMMARY

The following presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

The subject application relates to a user interface(s), system(s), and/or methodology that facilitate improved management and coordination of activities, events, and occasions using a digital calendar format that can be accessed anywhere, changed or edited with ease, and readily synchronized on different devices. In particular, an inkable digital calendar system is provided that allows multiple users to access, view, and make additions, deletions or changes to calendar items such as activities and events from any location. The user interface includes multiple views such as month, week, and day views. Data can be entered via any input device such as by keyboard, mouse, stylus, touch, voice, or inkable pen which allows a user to write directly on the display screen. The calendar system can be customized and/or personalized depending on a user's or family's preferences. For example, different backgrounds can be selected such a one per month; and color can be employed to denote particular events, activities, subject, or user. Additional features include resizable items, highlighting or otherwise visually indicating more noteworthy items, and reminders sent from the calendar to other remote devices such as a PDA, cellular phone, or smart phone via text messaging or email.

The digital calendar system can be readily accessed by one or more users of a group or family, for example. Thus, security procedures for access may be minimal or non-existent in some cases to optimize use and accessibility of the calendar system. Given this level of unrestricted access by a plurality of users, additions, changes, or deletions to the calendar can be tracked and/or readily undone if needed so that items are not inadvertently or intentionally changed without the knowledge of others.

Any calendar data can be stored on the local device or communicated to a remote server such as a web-based server. Other portable devices can access the server to view, add events or edit previously scheduled items from a remote location (e.g., in the car or at work). Any changes made remotely can be uploaded to update the calendar on the local device (e.g., at home). Thus, family member users can readily coordinate their individual schedules and gain improved awareness of the overall family schedule while mitigating conflicts and confusion.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 6 is an exemplary user interface of an options menu for each calendar item that provides optional information that can be entered for the calendar item.

DETAILED DESCRIPTION

Figure 1:
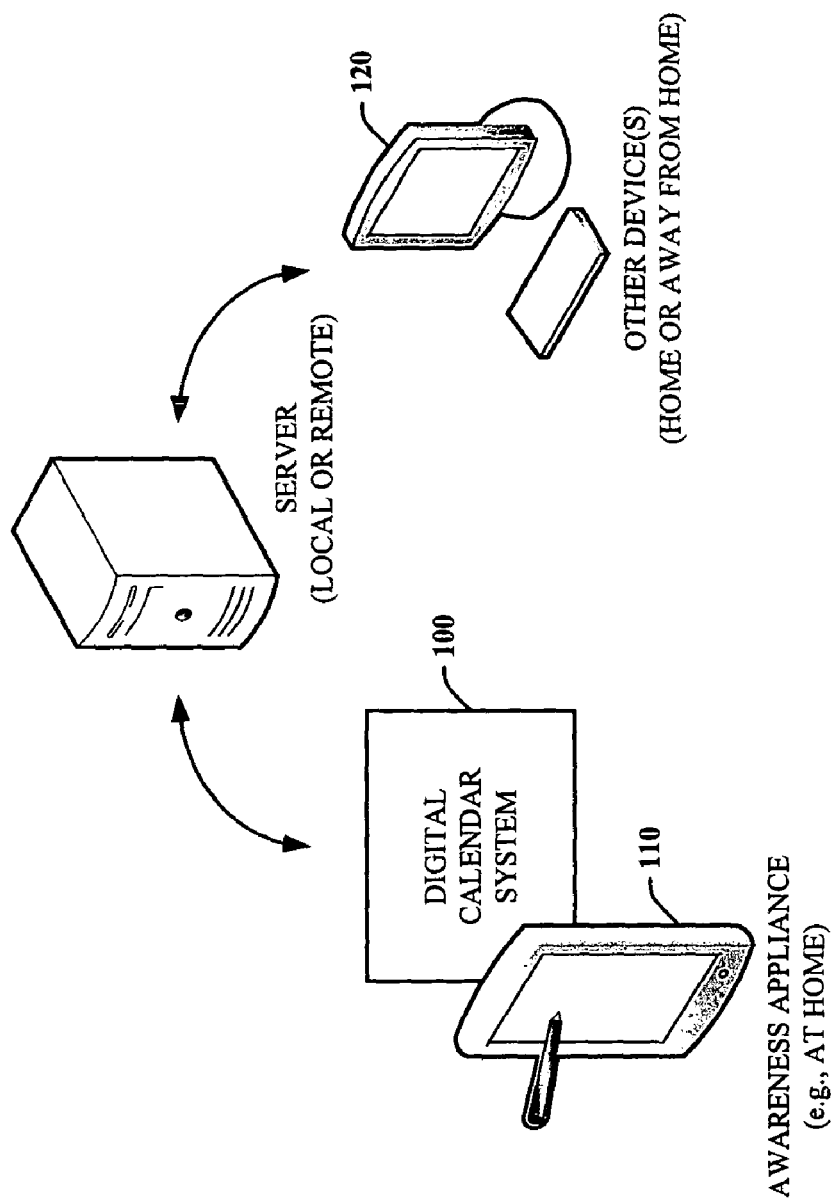
FIG. 1 is a block diagram of a digital calendar system located on a local awareness appliance as well as one or more remote devices that facilitate scheduling coordination among its users regardless of the users' location.

The subject systems and/or methods are now described with reference to the drawings, wherein like reference numerals are used to refer to like elements throughout. In the following description, for purposes of explanation, numerous specific details are set forth in order to provide a thorough understanding of the systems and/or methods. It may be evident, however, that the subject systems and/or methods may be practiced without these specific details. In other instances, well-known structures and devices are shown in block diagram form in order to facilitate describing them.

As used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject systems and/or methods can incorporate various inference schemes and/or techniques in connection with the placement or appearance of calendar items based on user input or user behavior. For example, a digital calendar system can learn that items associated with a person's name or with event names or subjects should be displayed in a visually different manner from other calendar items. Imagine that a user routinely makes items including the name "Colin" appear green while items for "Mike" are typically written in red. To save the user time, the digital calendar system can make use of one or more various inference schemes to learn this behavior and then perform it automatically the next time an entry for Colin or Mike is made by the user (or any other user). By doing so, consistent visual cues or patterns can be maintained despite entry of calendar items by different household members or users.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Families must continually organize, plan, and stay aware of the activities of their households in order to coordinate everyday life. The problem is that despite having organization schemes, many people still feel overwhelmed when it comes to family coordination. To overcome the many limitations or restrictions with paper calendars and conventional electronic calendars, an inkable digital calendar system designed for multiple users that can be easily updated to mitigate the need to maintain many disparate calendars is provided herein. In most instances, coordination is not typically done through the family calendar; rather, the family calendar is a tool that can provide family members with an awareness of activities and schedule changes that in turn enables coordination. Thus, the subject digital calendar system discussed herein includes tools that enable families to use their own coordination routines without the severe restrictions of existing paper calendars and traditional Web or electronic calendars.

Referring now to FIG. 1, there is a general block diagram of a digital calendar system 100 located on a local awareness appliance 110 as well as one or more other devices 120 that facilitate scheduling coordination among its users when they are at home and/or away from home. More specifically, the local awareness appliance 110 may be located in a convenient or high-traffic room in a user's home such as the kitchen, for example. When put into use, the digital calendar system 100 can be quickly viewed at-a-glance on the local awareness appliance 110. In addition, the awareness appliance 110 and hence the digital calendar 100 may be open to any user in the home without restrictive access measures or security protocols. Hence, the appliance 110 affords a "walk-up-and-use" model, allowing any user (in the home) to readily view, modify, or edit calendar items or make various notes thereon such as grocery lists, recipe ingredients, driving directions, and phone numbers or messages in a digital medium.

Any information entered into the digital calendar system 100 can be stored, retrieved, and/or synchronized with other devices 120 to mitigate the need to maintain different calendars or different versions of calendars. In particular, the awareness appliance 110 can store the data internally or externally on a server located in the home or at a remote location. Thus, essentially one calendar can be kept and updated with ease so that its users can readily manage and coordinate their schedules in a more efficient manner without the need to keep up with multiple calendars—some paper; some electronic.

In practice, for instance, imagine that Mary and John Smith have two teenage boys who are each involved in different sports and clubs in school. John travels for business several times each month and Mary volunteers part time for a few different organizations. The Smith family calendar includes practice and game times for both boys as well as a few meeting times for their clubs, routine dentist appointments for all of them, birthday parties, dinner dates with friends, Mary's volunteer schedule and John's travel dates for the next month or so. Mary gets a call at home from her sister Jane asking if their families can get together for brunch this Sunday. With a quick glance at the digital calendar in month view from the local awareness appliance 110 (e.g., in the kitchen), Mary writes in "brunch with Jane and fam" and drags the item to Sunday. The Smiths also have a home office or den, where John likes to retreat to relax and go through his magazines, bills, and other mail. From the computer (120) in the den, he can check the digital calendar to see if there are any plans for the upcoming weekend. The current digital calendar can be uploaded or updated with any changes made (e.g., via a "sync" operation) so that the calendar viewed in the den is the same version as the one maintained on the local awareness appliance (110) in the kitchen. From the computer in the den, John can also interact with the digital calendar. For example, John can cancel a trip scheduled for next week and add in a new trip for the week after. In the kitchen, Mary can check for any changes to the calendar by an update or sync operation in order to view John's changes. Moreover, the digital calendar system 100 provides improved coordination among or between multiple users in part by increasing the flexibility of data input and synchronization with multiple devices.

Figure 2:
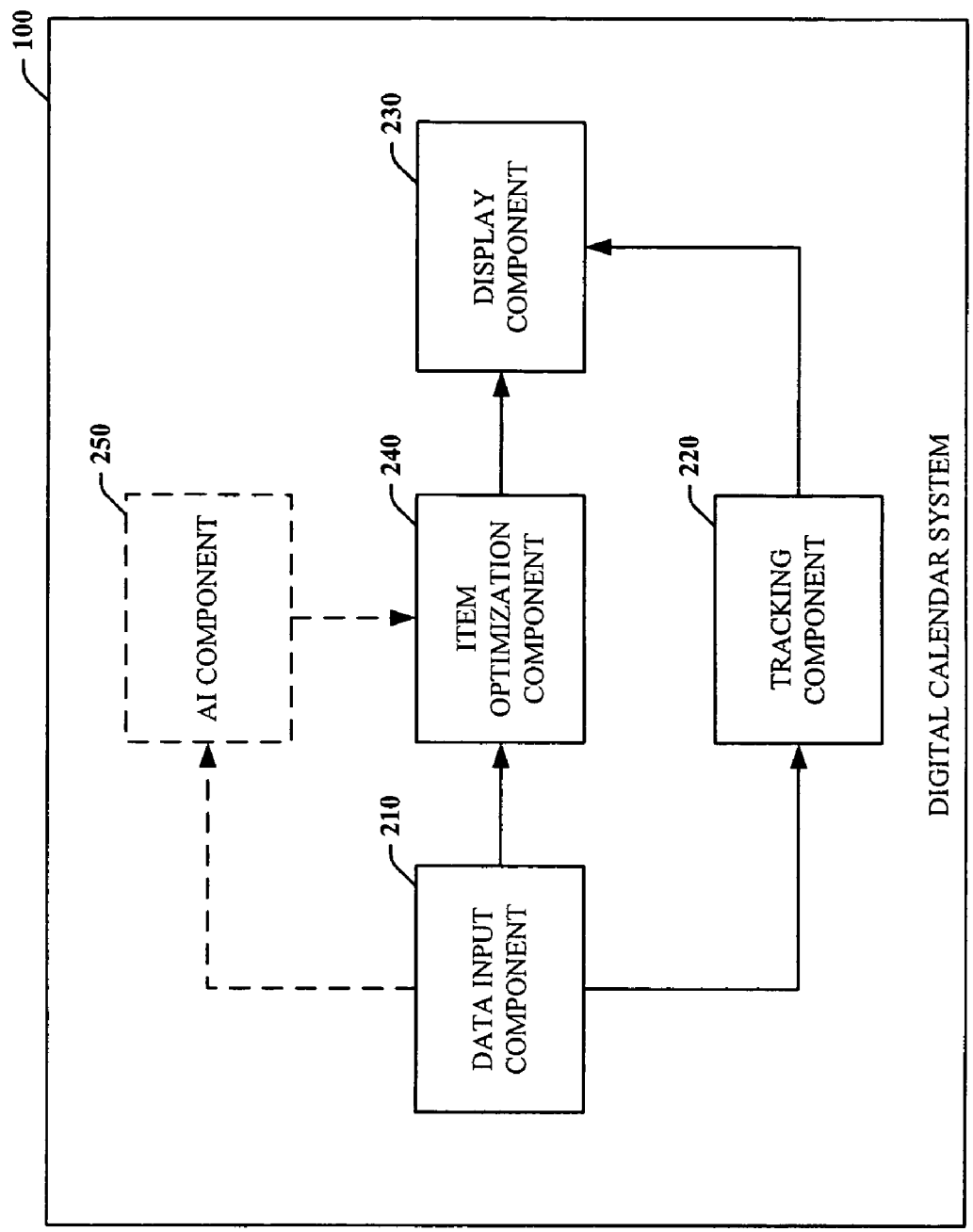
FIG. 2 is a block diagram of a digital calendar system that facilitates organization, navigation, and visibility of calendar items.

Referring now to FIG. 2, there is a block diagram of an exemplary digital calendar system 100 that facilitates organization, navigation, and visibility of calendar items. The digital calendar system 100 includes a data input component 210 that can receive input regarding new calendar items and/or modifications to existing calendar items. Input can be received from a variety of input devices such as an inkable pen or stylus, keyboard, mouse, touch, and voice (via a voice recognition component/system). Input can be analyzed and characterized as new content or as modifications to existing content. Visualization cues can be employed to make new items more noticeable. For example, they can be viewed in a "new items" list for a period of time from when they were entered. Each new item can also be noted with a symbol so that when a user views the calendar such as in month view, the symbol is shown with the new items for a period of time. Similarly, changed or modified items can be tracked by a tracking component 220 and displayed in a list by a display component 230. By tracking changes including deletions in this manner, modifications to the calendar items can be monitored to mitigate altering or removing an item without another user's knowledge. Essentially, the tracking component 220 can control access to the digital calendar so that users cannot intentionally or unintentionally remove or change the content, dates, or times of events or activities.

As is often the case, some days are more congested with appointments than other days. To accommodate the visibility of items on such days, an item optimization component 240 can organize items for any particular day in chronological order and/or in a layout that optimizes the visibility of each item so that items are not inadvertently hidden from view. The optimization component 240 also allows items to be re-sized either manually by the user or automatically based on the item's content, time detail, or priority rating. For example, items that include certain words or names such as "dinner" or "Mariners" may be automatically sized smaller than other items to make better or more efficient use of the available space for each day. An AI (artificial intelligence) component 250 can be trained to learn such user behaviors or preferences.

In another example, items which are not associated with a specific time (e.g., designated "anytime") may also be made smaller in terms of viewable size than those items set to occur at a specific time. Alternatively or in addition, "heavier" days can be enlarged and less busy days can be shrunken accordingly while still maintaining the spatial integrity of the calendar grid to optimize the overall display space available for the calendar. That is, days with very few or no activities may not be completely obscured by days with many activities.

Figure 3:
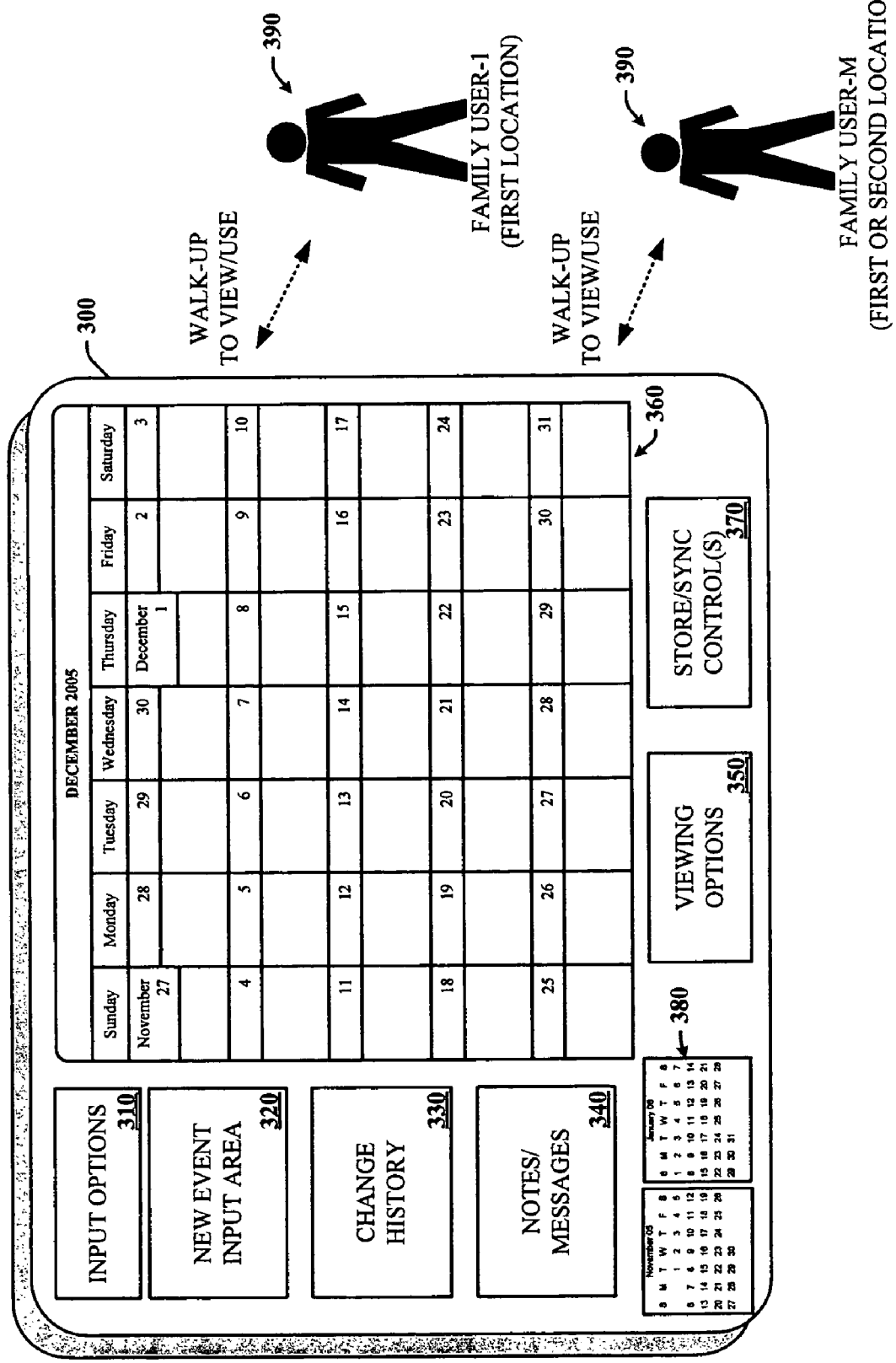
FIG. 3 is a diagram of an exemplary user interface of a digital calendar system that facilitates user interaction by and schedule coordination between multiple users.

Turning now to FIG. 3, there is a block diagram of an exemplary user interface 300 of a digital calendar system that facilitates interaction by and scheduling coordination between multiple users. The user interface 300 includes input options 310 which may relate to ink color, ink width, erase mode, font, and/or input tool; a new event input area 320; a change history display 330; a notes/messages area 340; viewing options 350 that allow a user to change or toggle the current view of the calendar in the display space 360 (e.g., month, P-month (where P is an integer greater than one), week, day, today, etc.; and a store/sync control(s) 370. In addition, the previous and subsequent months (380) can be displayed as well for recall of past dates or future planning.

Different users (390) can essentially walk-up and interact with the digital calendar to view upcoming or previous activities, add time or other details to an existing item, start or add to a grocery list, add a reminder to an item, or to quickly determine if they are available for a proposed activity. For example, a user can look at her family calendar in a 2-month view to see the current month and the next month to facilitate planning a week-long vacation with friends. The user can quickly switch to today's view to determine if she has time to workout in between her afternoon appointments. To make sure she has time to workout tomorrow, she creates a new event item called "mom workout" so that her kids and husband are aware that she will not be home right after a business meeting. Likewise, her kids can view the calendar and see that their mom has already noted the change in their softball practice time and that their dentist appointments were rescheduled for next week. Thus, the digital calendar system is accessible and usable by different users to promote and improve awareness and coordination of schedules, particularly in a multi-user household or environment.

Figure 4:
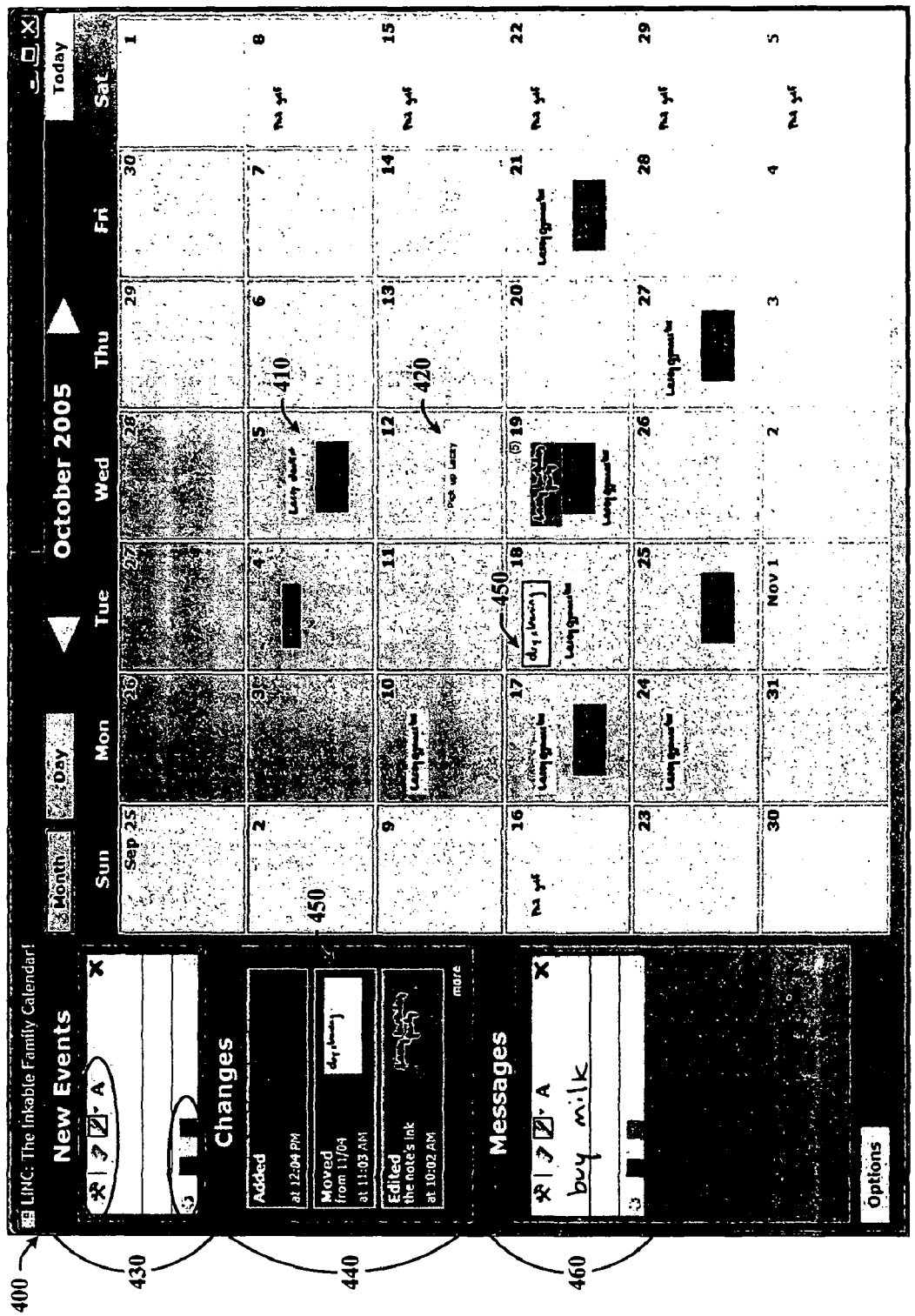
FIG. 4 is an exemplary user interface of a digital calendar system in month view that demonstrates a plurality of calendar items which have been entered via inking or typing.

Moving on to FIGS. 4-11, there are a series of screen captures of exemplary user interfaces that demonstrate different aspects of a digital calendar system as described herein. In FIG. 4, a month view of a family's digital calendar 400 is illustrated. As can be seen by the month view, a plurality of calendar items have been entered in either an inked 410 (handwritten by user) or typed 420 format. The inkable format (410) of the digital calendar provides the users with additional flexibility and saves time, thus making use of the digital calendar more efficient and practical than conventional alternatives.

To add a new event or to create a calendar item, the user can select an input format such as ink (pen) or type (e.g., keyboard). Other related selections can be made as well via one or more available toolbars (circled). When ink is chosen, the user can select an ink color and/or ink width, and then using an ink stylus, can write directly in the new event space 430. The new event space 430 is similar to a notepad with an unlimited number of sheets. Lines may be provided as a writing guide in the space 430. When the user is finished with entering the information, the note can be dragged to the desired day on the calendar 400 using one or more control points on the note. The color and size of the note can be customized according to the user's preferences. Alternatively, the digital calendar can learn by way of artificial intelligence or inference schemes that notes containing certain words or names are usually made a particular color and then alter the color of the note automatically. When the note is dragged onto the calendar, it may shrink in dimension to a smaller uniform size but remain substantially readable. To enlarge the view of the note, the note can be resized manually at one or more control points or such points can be clicked on for zooming in or out. Dragging off the calendar can cause notes to grow to their full size.

In the month view, the calendar can provide at-a-glance awareness of multiple events per day when they are sized accordingly. However, more events on a day may cause overlap of the notes. Should there be so many events that at least one event appears buried or hidden from view, various visual cues can be employed to make it readily apparent to the user that some events are "off-screen" or otherwise out of view. In addition, the user can hover over open space on the day to see a total number of notes present. Alternatively, the total number can appear in the open space near the day (see e.g., Oct. 19, 2005). This notation can also be triggered when more than y events are scheduled on any day. To modify any information relating to the item such as the time of day, setting a reminder, or the content of the note, a menu can appear for each item when hovering over the item, for instance (e.g., FIGS. 6 and 7, infra).

Any changes made to the calendar can be listed and made readily visible to the user such as under a "Changes" area 440. Calendar items which have been added, moved, deleted, edited, or otherwise modified can be viewable here such as in chronological order of when the "change" occurred. For each relevant item, the type of action taken and when such action was taken can be indicated as well. In addition, the user can click on, select, or hover over a "changed" item and the corresponding item on the calendar can be highlighted for improved visibility of the item's current placement. By way of illustration, an item 450 called "dry cleaning," which was moved from 11/04, is selected in the changes area 440 and thus appears highlighted (with a blue box) on the calendar—see Oct. 18, 2005, the new, current date. The user can view a truncated list of the most recent changes made or can view all changes ever made by expanding the changes area 440.

Miscellaneous notes, grocery lists, phone numbers (e.g., related to a calendar item), and the like can be maintained in a "messages" or similar input area 460. Personalization tools similar to those made available in the new event space 430 may also be available in the messages area 460. Thus, users can write, type, and erase content (messages) in this area 460. Messages can also be associated with one or more calendar items by dragging the message to and dropping it on the calendar item. A symbol indicating that a message exists for the calendar item such as a pushpin, star, or colored dot, can appear on the item. In general, messages can be saved according to when they were created and later retrieved when needed.

Although much of the discussion relating to data entry in the calendar relies on direct user input by keying or writing, calendar items can also be added, modified, or deleted by downloading information from external sources such as the Web, email, or information stored on another device that can communicate with the digital calendar system. For example, imagine the user is a Mariners season ticket holder and would like to calendar all of the home games. The user can download or import the schedule from the Mariners' website onto his/her digital calendar.

Figure 5:
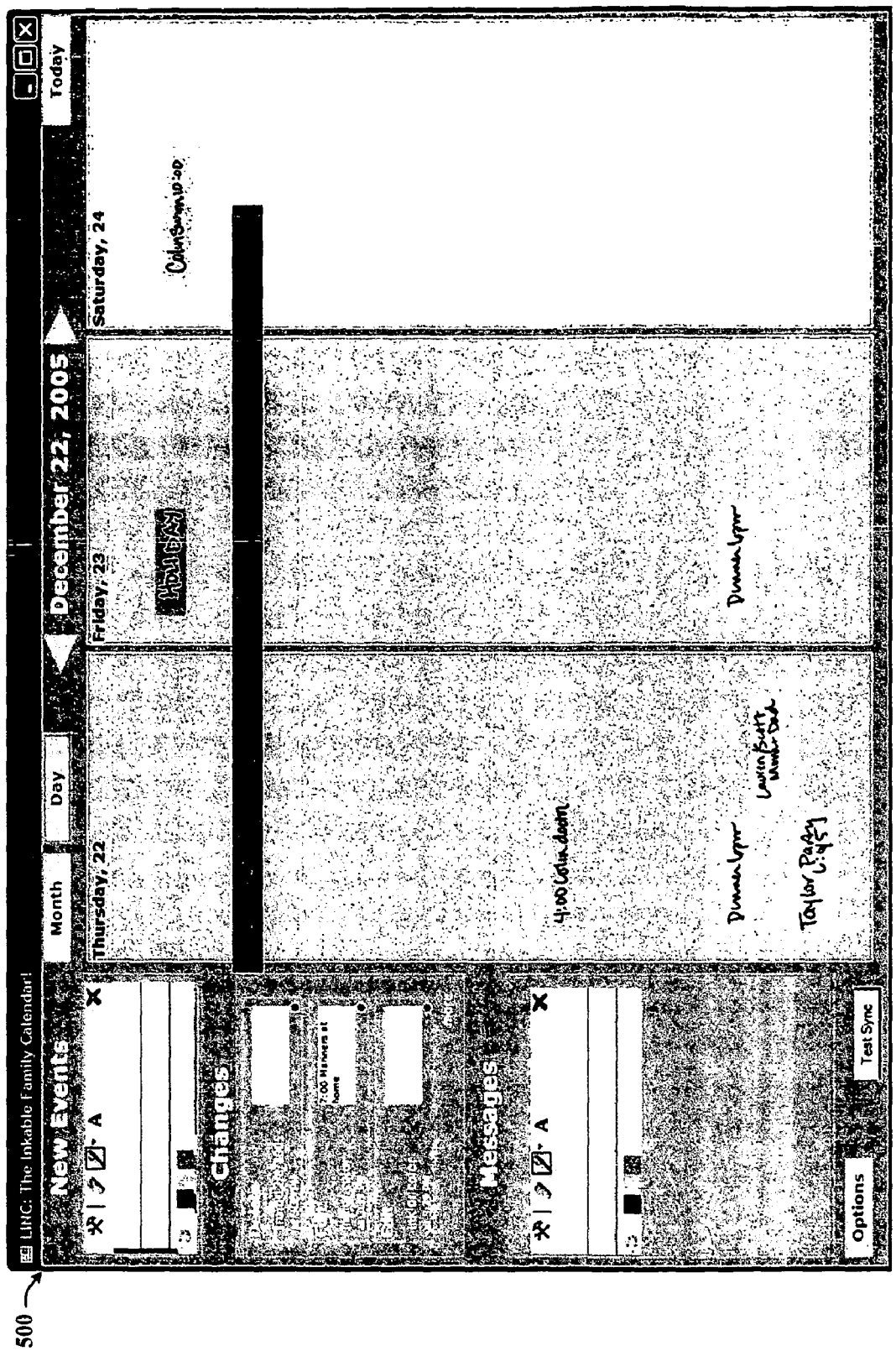
FIG. 5 is an exemplary user interface of a digital calendar system in day view where items are organized according to time buckets.

From the month view of the calendar, the user can quickly switch to a day view, which is illustrated in FIG. 5. In particular, FIG. 5 represents an exemplary user interface 500 of a digital calendar system in "day+2" view where calendar items are organized according to time buckets including any time, morning, afternoon, and evening. Time buckets allow the user to spatially organize events throughout the day. In the "day+2" view, the user can see the desired day as well as two additional days which may be the next two days, the previous 2 days, or the day before and the day after. Alternatively, the user can set the day view to see only one day at a time or day+n, where n is an integer greater than zero. The system may set a maximum value to n.

On Saturday, December $24^{th}$, a calendar item noting Colin swim 10:00 is in the "Any time" bucket. To manually add information for this item such as assigning to occur at a particular time or time frame or setting a reminder, the user can double click on it or right click on the item to select an appropriate menu. A new window 600 can open as illustrated in the exemplary user interface in FIG. 6. This window allows the user to enter optional information for the calendar item such as a specific start and/or end time, reminder, or to make copies of the event for recurrences. Alternatively, the calendar system can recognize the time element (e.g., by format) and automatically associate the time of 10:00 with the note and place it in the morning bucket. Artificial intelligence or inference schemes along with other processors can recognize the time component of the entry and learn that the user intends the time to fall within A.M. or P.M. For example, based on analyses of the user's previous calendar items (e.g., their content and time of occurrence), "Colin swim 10:00" is more likely to occur in the morning than at night. The system can automatically place the item in the most appropriate bucket or suggest its placement to the user.

Still referring to the window 600, the written or typed content of the item itself can be modified as well. For example, the user could add bring snack to the note (below Colin swim 10:00) using the ink stylus or keyboard. As it currently appears in FIG. 6, there is no start or end time, no reminders set, and no copies of this event are desired. However, these details can be modified as demonstrated in FIG. 7.

Figure 6:
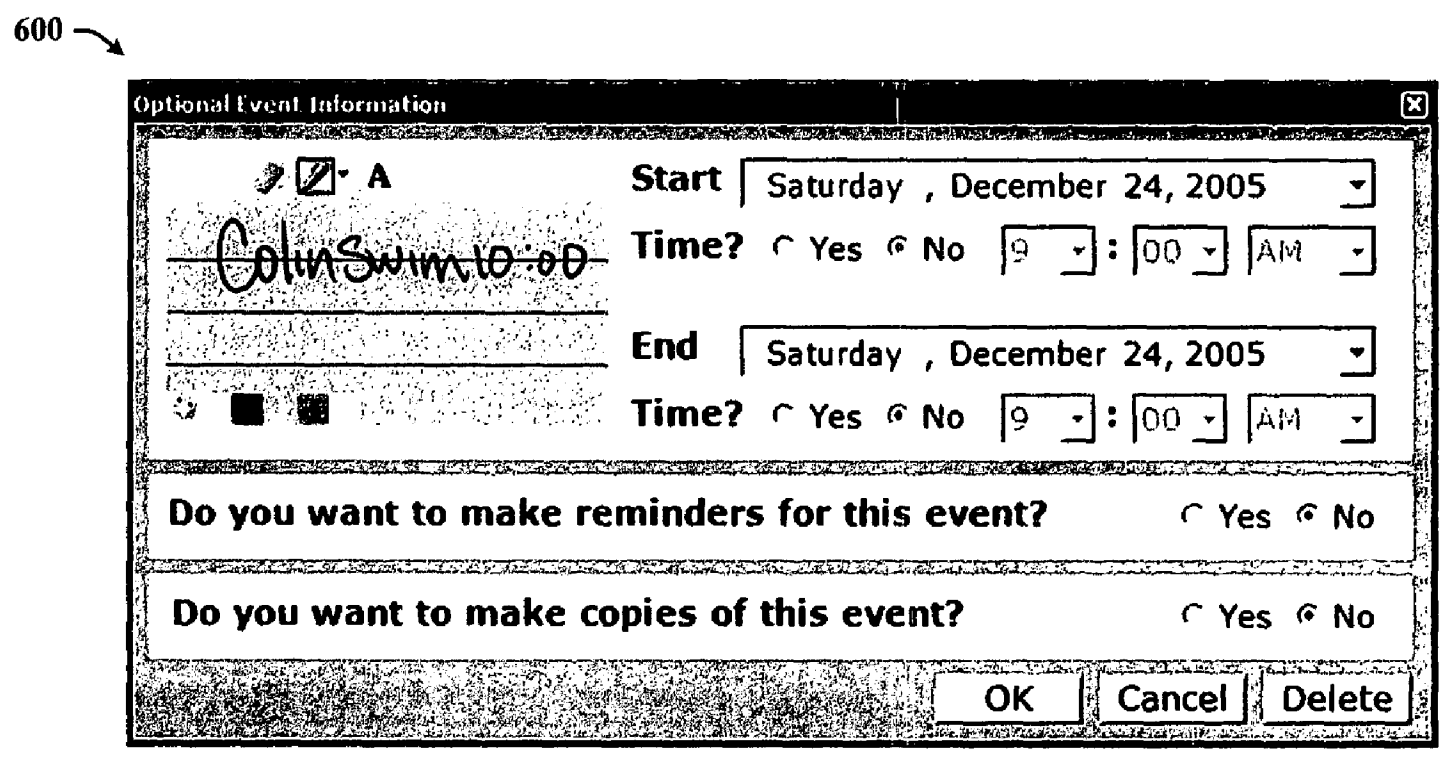
Figure 7:
FIG. 7 is an expanded view of the options menu of FIG. 5 that can be presented to a user depending on the user's input.

The user interface 700 in FIG. 7 is an expanded view of the optional information menu of FIG. 6 that can be presented to a user based on the user's input. For instance, the user has set a start time of 9:00 AM, desires one reminder for the morning of the day (more than one reminder can be scheduled), and indicates that the event will recur on at least one additional date. Rather than being restrained to events recurring only daily, weekly, monthly, annually or the like, the subject digital calendar system allows the user to simply copy the event to selected dates. This can be accomplished in part by selecting the desired month view (e.g., December 2005 is currently shown) and then clicking on the desired days on which the event is to occur. Thus, if soccer practice is on a Tuesday and Wednesday this week but only Thursday next week, and then Monday and Wednesday of the following week, and so on, the user can select the appropriate days and the event will be copied to those days. This can be particularly useful since many events may not recur in a pattern but may be more sporadic or vary from week to week or month to month.

Figure 8:
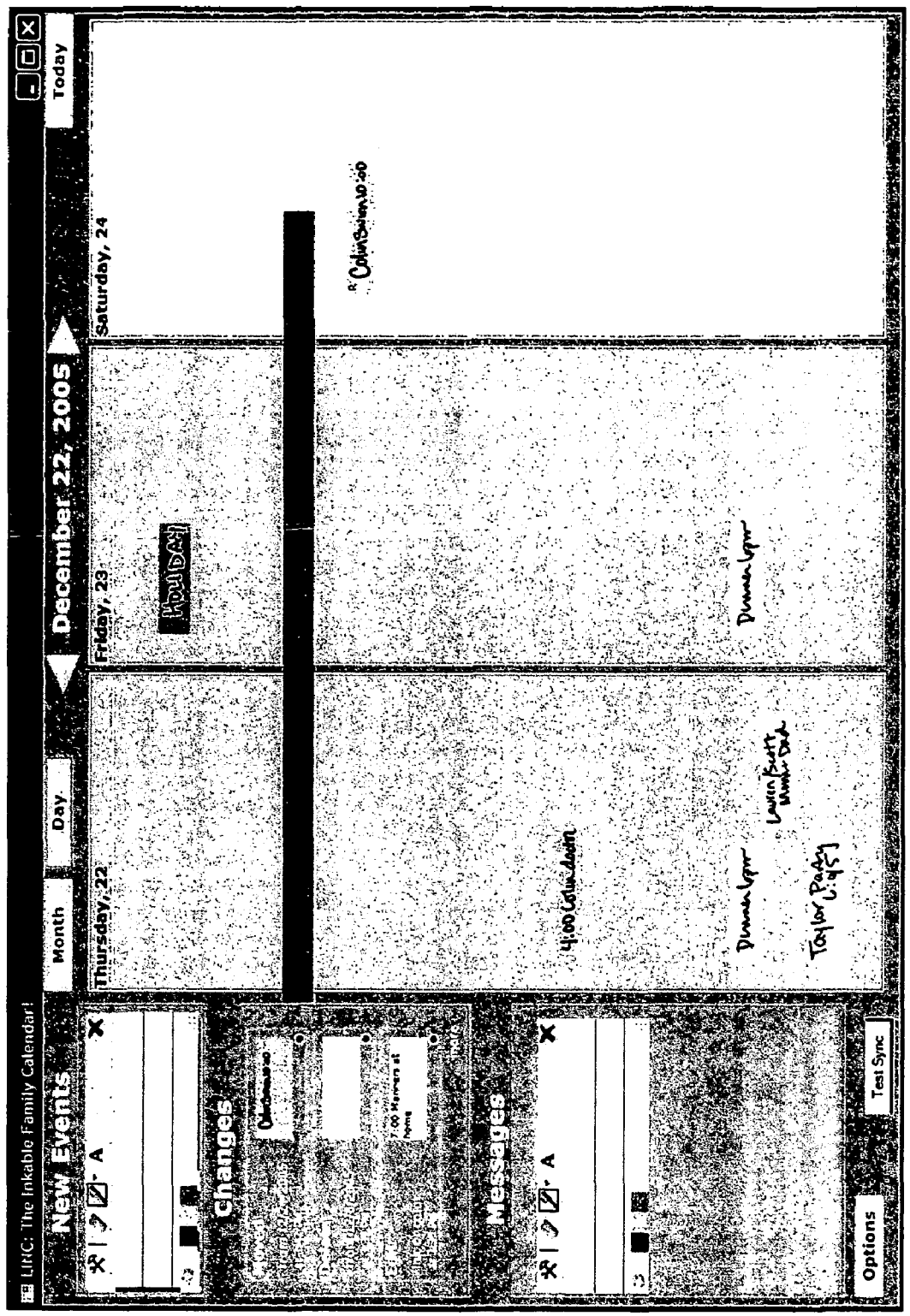
FIG. 8 is an exemplary user interface of a digital calendar system in day view that demonstrates the movement of a calendar item based on the event information entered.

After changes are made or accepted, the user can be returned to the previous view (e.g., day+2 view) as illustrated in FIG. 8. As can be seen, the calendar has processed the new time detail and moved the Colin swim item to the "morning" bucket. A symbol has also appeared next to the item to indicate that a reminder has been set. In this case, the symbol is an R but it should be appreciated that any symbol or icon can be employed.

Figure 9:
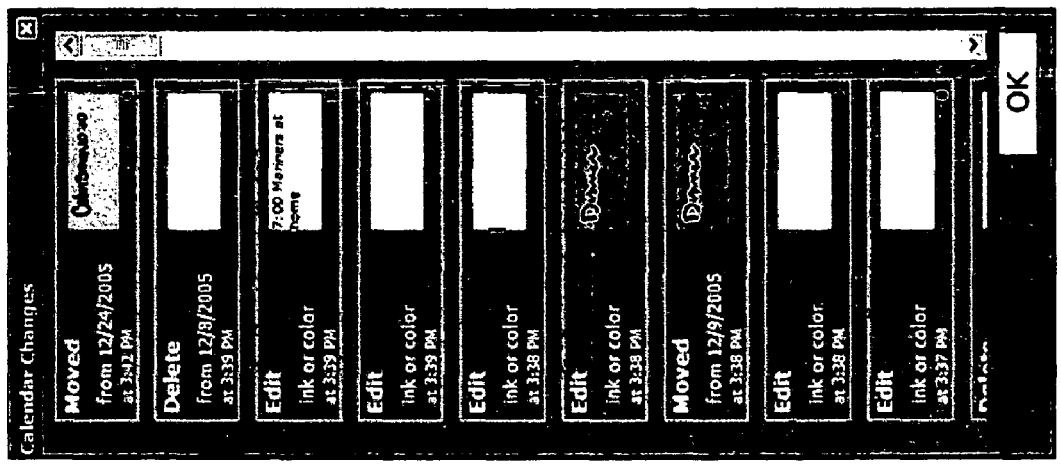
FIG. 9 is an exemplary user interface of a change history in a digital calendar system that facilitates tracking any changes made to the calendar.

Turning now to FIG. 9, there is an exemplary user interface 900 of a change history that tracks any changes made to the calendar for all time or for a selected period of time. Here, the most recent change to Colin swim 10:00 is displayed along with several other changes.

Figure 10:
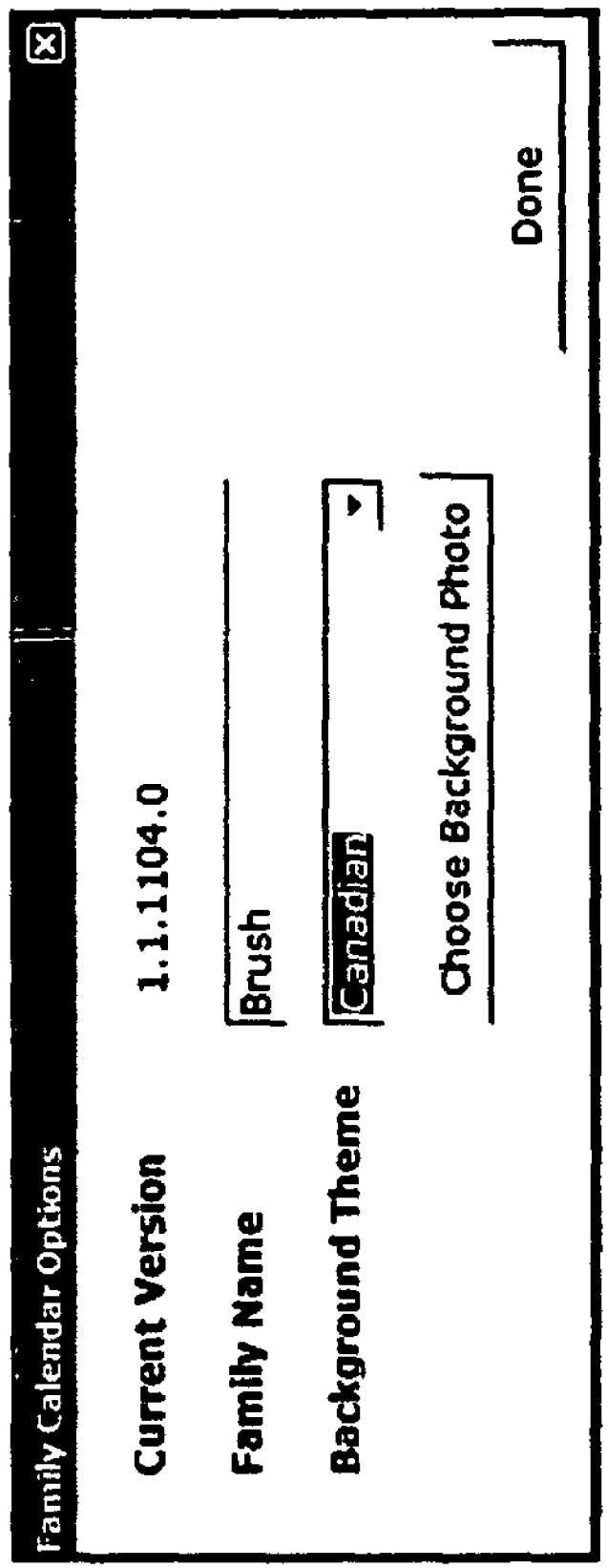
FIG. 10 is an exemplary user interface of an exemplary options menu for a digital calendar system that facilitates personalizing the calendar.

As described hereinabove, the digital calendar system can be personalized for each group of users (e.g., each family) in a number of different ways. In addition to customizing how information is entered and how it is presented on the calendar, the overall display of the calendar can be personalized as well. FIG. 10 illustrates an exemplary user interface of an options menu for the digital calendar system that allows the user to identify the family's name and to select background photos for each month. Though not shown in the figures above, the digital calendar system can also employ sound clips, music, and other types of audio (e.g., voice recordings) based on the user's preferences. For example, when noting a family member's birthday, a selected song such as the birthday song or other audio clip can be selected to play on that day at a certain time or at set intervals of time (e.g., every 2 hours, every hour, every hour beginning between 5 and 6 PM, etc.).

Similarly, digital stickers can be used as well to symbolize or highlight particular events or activities. For instance, a soccer ball sticker can be used to denote a soccer game instead of writing out "soccer game" on a particular day. Likewise, imagine that the user donates blood every 3 months. Rather than writing out "donate blood", the user can simply place a "heart" sticker on the appropriate days.

Figure 11:
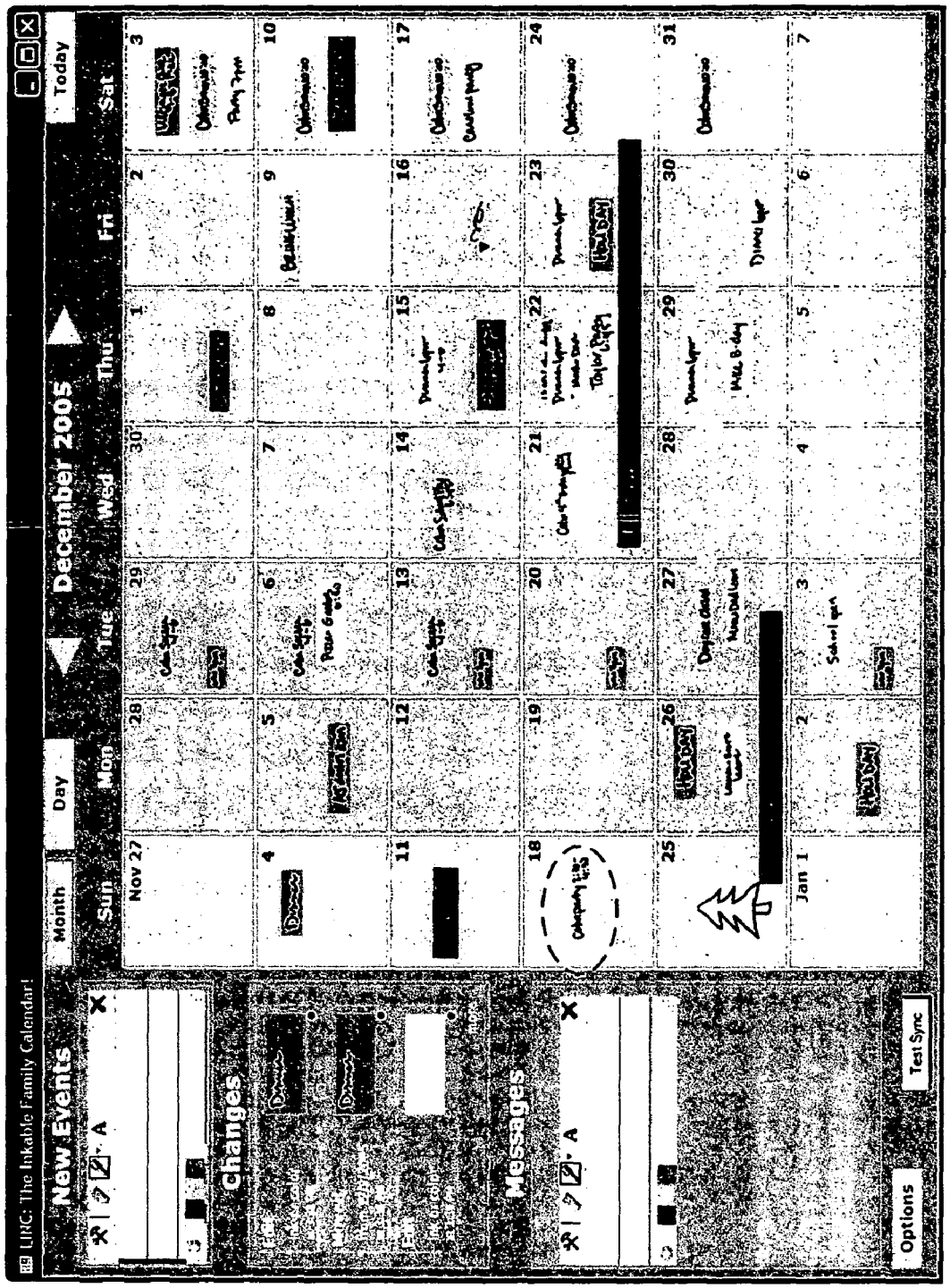
FIG. 11 is an exemplary user interface of a digital calendar system in month view that demonstrates various features to allow for improved interaction with the calendar.
Figure 12:
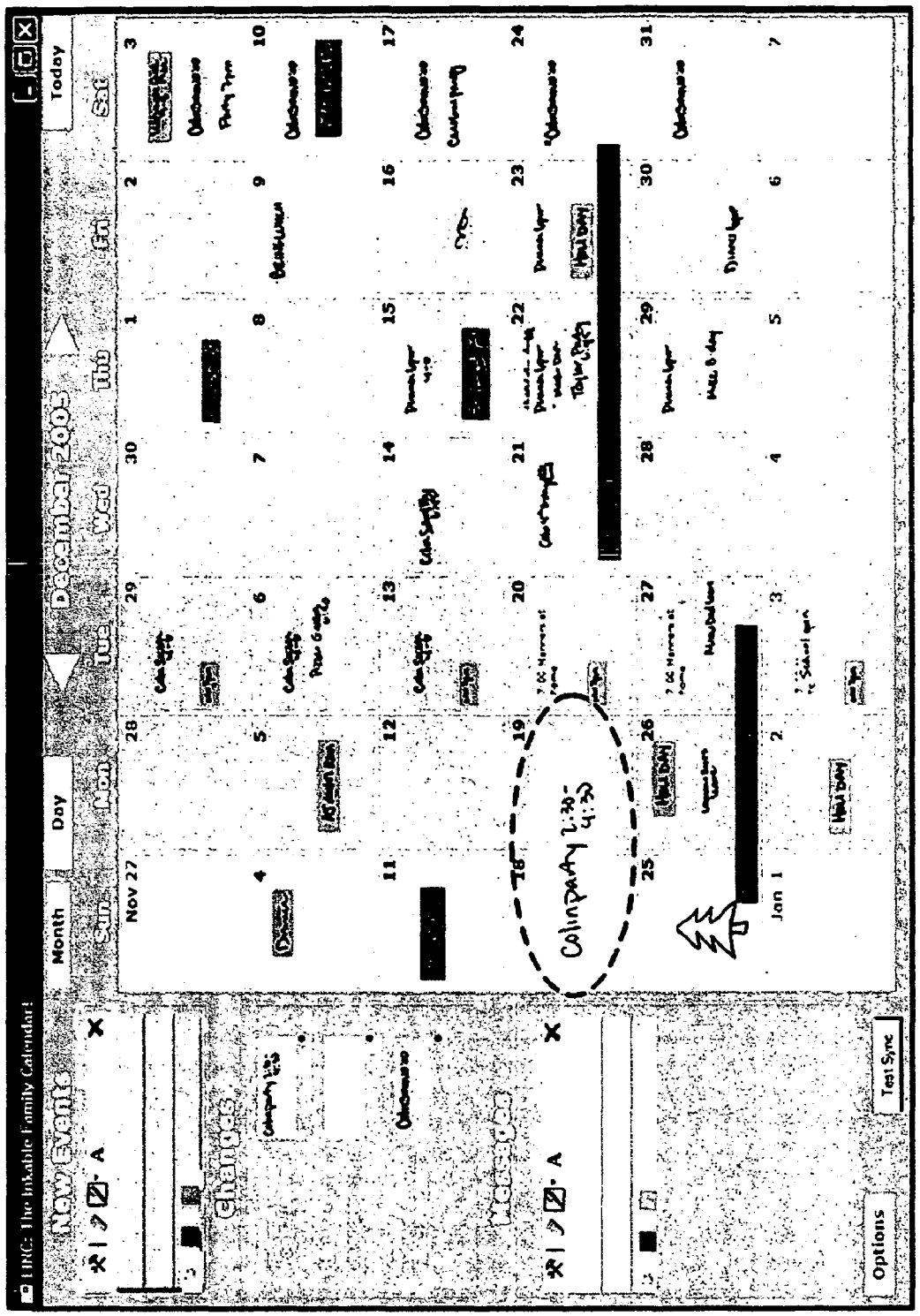
FIG. 12 is an exemplary user interface of a digital calendar system in month view that demonstrates the resizing capabilities of desired calendar items to indicate importance or noteworthiness for the user(s).

Turning now to FIGS. 11 and 12, yet another feature of the digital calendar system is demonstrated. In FIG. 11, the exemplary user interface depicts a multitude of calendar items for December 2005. In particular, notice the item which has been circled with a dashed line for emphasis on the $18^{th}$. To enlarge the content size in the item, the user can resize the item by dragging one or more control points. By doing so, the content of the item appears larger as indicated in FIG. 12 (see item circled with a dashed line). Depending on the user's settings, extending the item into other days can also mean that the subject event extends to those days as well. Thus, by expanding Colin party 2:30-4:30 to fall on the $19^{th}$ as well as the $18^{th}$, the calendar may consider this to be a "change" and note it as such.

Figure 13:
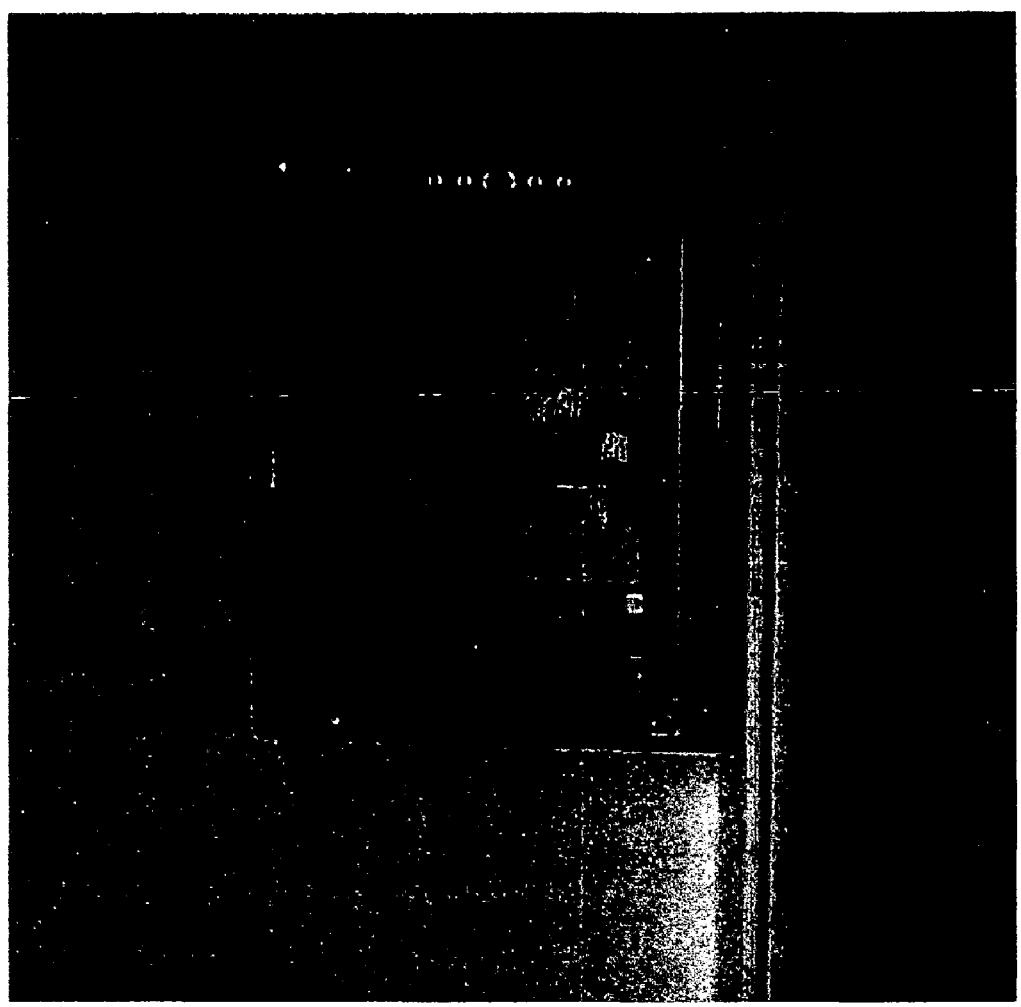
FIG. 13 demonstrates an exemplary digital calendar system as it may be used in conjunction with an awareness appliance such as the one shown in the figure to provide improved convenience and to facilitate awareness of users' activities.

The digital calendar system can be presented to its users in an awareness appliance with open access to any user. Conventional computer-based calendars as well as web calendars require time-consuming logons and access procedures and requirements and often are not easily positioned in a high-traffic area for maximum use, viewing, and interaction by their frequent or infrequent users. Unlike web calendars, which require web access to view or otherwise use the calendar, and contrary to other computer calendars, which can typically only be referenced or glanced at when the computer is on and can be difficult to synchronize with other calendars kept by different family members, the digital calendar system discussed herein provides always-on-and-available access to any user so that a heightened level of awareness of activities or an awareness of availability can be continuously maintained by those who interact with it. FIG. 13 depicts an exemplary awareness appliance for the digital calendar system as it may be employed in practice by one or more users. Whether positioned vertically as shown or horizontally on a table or desk, the digital calendar system affords improved coordination between or among a plurality of individuals by allowing users to walk-up and instantly view the calendared items, view any modified or new items, and add, make changes, or delete items. Hence, the digital calendar system can be publicly visible on the screen at substantially all times. Unfortunately, conventional computer calendars require a special or secure login to access the computer in general, which can impede or hinder "public" (e.g., other users besides the primary user of the computer) access to the calendar.

Various methodologies will now be described via a series of acts. It is to be understood and appreciated that the subject system and/or methodology is not limited by the order of acts, as some acts may, in accordance with the subject application, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject application.

Figure 14:
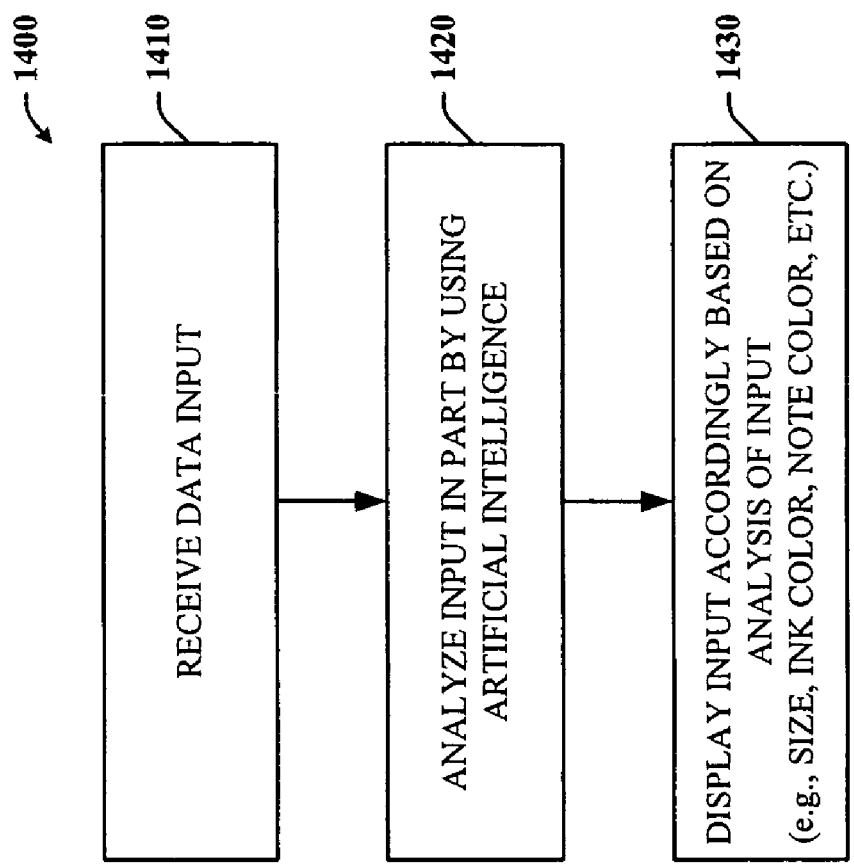
FIG. 14 is a flow chart illustrating an exemplary methodology that facilitates managing the organization and/or display of items on a digital calendar interface.

Referring now to FIG. 14, there is a flow diagram of an exemplary method 1400 that facilitates organization and display of calendar items on a digital calendar interface. The method 1400 optimizes the visibility of items particularly when multiple items exist on or for a particular calendar day or time bucket. At 1410, data input can be received and analyzed in part by using artificial intelligence or inference schemes at 1420. At 1430, the input can be displayed according to such analysis. More specifically, the method can learn that some items are more important than others to the user or that the user prefers to display some items in a different manner for better visual distinction. For example, the digital calendar system can employ a traditional calendar grid and spatial layout such that each day includes a substantially similar amount of space. As more events are scheduled for a particular day, the items may overlap and items may inadvertently bury or completely obscure other items. To mitigate the possibility of missing events or dealing with buried calendar items, the system and method can automatically organize the layout of the items as each additional item is added to the day. For example, assuming item overlap is permitted by the user(s), the system and method can overlap items so that their content is still legible to the extent that the user(s) can readily recognize what the item is. Imagine an item reads Colin piano lesson but the piano lesson portion is covered by another item. The user would still be able to identify that the item relates to Colin. Even more so, Colin may be enough to remind the user of the item or to identify the item to the user. To view the item in full or to bring the item to the top (of the stack of items), the user can click on the item.

The system and method can also be programmed to present a symbol or icon on the day to inform the user(s) that other items exist for the day but are not shown in the current (month) view. To view all the items, the user can click on the symbol or icon or on some other control point on the day. For instance, the user can set to view no more than 4 items on each day in month view. The items chosen to be shown may be determined based on previous user behavior or user preferences, both of which can be learned as well. In this case, the system and method may have learned that items including "Jane" or "Lauren" therein should always be visible in the month view of the calendar. Alternatively, "Jane" may take precedence over "Lauren" if there are more than 4 between the two names.

Some calendar items can be made more visible by making them appear in different colors or different font (ink) colors. Imagine that the user consistently or uses red notes for items involving Mike. To save the user time, the system and method can learn this behavior and automatically alter the color of the note when appropriate. For instance, once the user enters an item such as Mike on call, the method can recognize the word "Mike" and change the note color to the desired color. Various other behaviors can be learned as well to save the user time and make use and interaction with the calendar easier and more efficient.

Figure 15:
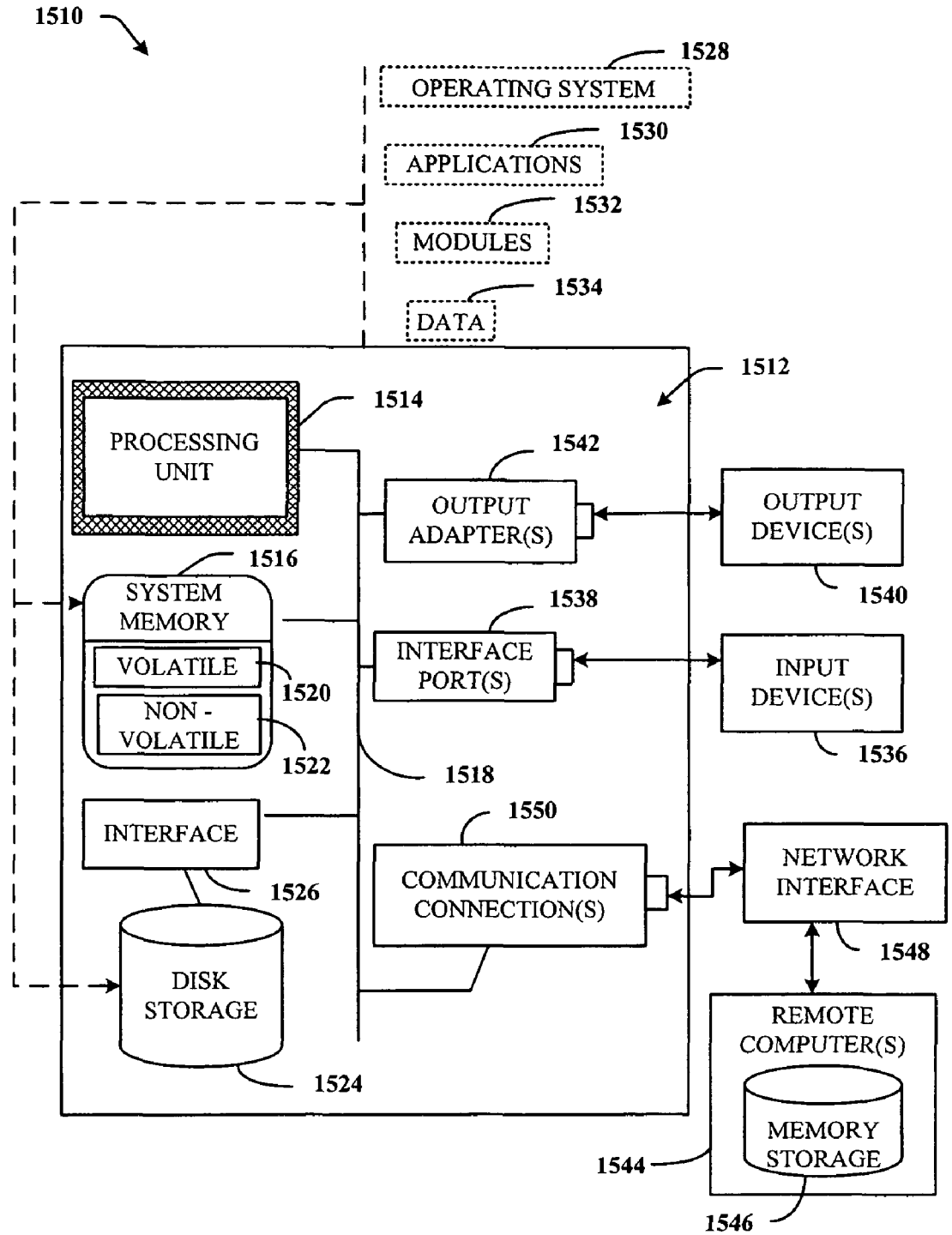
FIG. 15 illustrates an exemplary environment for implementing various aspects of the invention.

In order to provide additional context for various aspects of the subject application, FIG. 15 and the following discussion are intended to provide a brief, general description of a suitable operating environment 1510 in which various aspects of the subject application may be implemented. While the system(s) and/or method(s) is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1510 is only one example of a suitable operating environment and is not intended to suggest any limitation as to the scope of use or functionality of the system and/or method. Other well known computer systems, environments, and/or configurations that may be suitable for use with the system and/or method include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 15, an exemplary environment 1510 for implementing various aspects of the system and/or method includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable ROM (EEPROM), or flash memory. Volatile memory 1520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1512 also includes removable/nonremovable, volatile/nonvolatile computer storage media. FIG. 15 illustrates, for example a disk storage 1524. Disk storage 1524 includes, but is not limited to, devices like a magnetic disk drive, floppy disk drive, tape drive, Jaz drive, Zip drive, LS-100 drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to the system bus 1518, a removable or non-removable interface is typically used such as interface 1526.

It is to be appreciated that FIG. 15 describes software that acts as an intermediary between users and the basic computer resources described in suitable operating environment 1510. Such software includes an operating system 1528. Operating system 1528, which can be stored on disk storage 1524, acts to control and allocate resources of the computer system 1512. System applications 1530 take advantage of the management of resources by operating system 1528 through program modules 1532 and program data 1534 stored either in system memory 1516 or on disk storage 1524. It is to be appreciated that the subject system and/or method can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512 and to output information from computer 1512 to an output device 1540. Output adapter 1542 is provided to illustrate that there are some output devices 1540 like monitors, speakers, and printers among other output devices 1540 that require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

What has been described above includes examples of the subject system and/or method. It is, of course, not possible to describe every conceivable combination of components or methodologies for purposes of describing the subject system and/or method, but one of ordinary skill in the art may recognize that many further combinations and permutations of the subject system and/or method are possible. Accordingly, the subject system and/or method are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A calendar system that facilitates improving activity awareness and coordination of schedules among multiple users, comprising:
    a computerized awareness appliance for interacting with a user interface including one or more display views of a calendar grid;
    an event space adjacent to the calendar grid and formatted as a customizable notepad, text data being enterable in the event space in multiple selectable input formats including writing with a writing tool and typing;
    one or more navigation components that facilitate dragging and dropping the text data in the form of a note from the notepad to a selected day on the calendar grid to form a calendar item, wherein:
        a particular word in the note entered as part of the text data is recognized during creation of the calendar item; and
        a color associated with the calendar item is automatically selected from among a plurality of available colors based on learning from user association of the color with the particular word;
    one or more tracking components that track changes to calendar items made by users; and
    a changes area displayed distinctly from and concurrently with the calendar grid, the changes area displaying a history of the changes made to the calendar items, the changes area displaying the history of changes as a chronological list of the changes made to the calendar items.

2. The calendar system of claim 1, the one or more display views of the calendar grid comprising at least one of a month view, a week view, and a day view, the day view comprising at least one day.

3. The calendar system of claim 1, further comprising an artificial intelligence component that determines the color associated with the particular word based on learned user behavior that includes determining that calendar items containing the particular word have previously been made using the selected color.

4. The calendar system of claim 1, wherein:
    the particular word is a name of a particular user of the calendar system; and
    the color selected is learned based on past use of the color in association with the name of the particular user.

5. The calendar system of claim 1, wherein:
    a time entered as part of the text data is recognized during creation of a calendar item; and
    the calendar system automatically places the calendar item at the recognized time on the calendar grid.

6. The calendar system of claim 1, the changes displayed in the history comprising at least one of additions of calendar items to the calendar grid, deletions of calendar items from the calendar grid, or changes to existing calendar items displayed in the calendar grid.

7. The calendar system of claim 1, wherein selection of a changed calendar item in the changes area causes a corresponding changed calendar item in the calendar grid to be highlighted on the calendar grid for improved change recognition.

8. The calendar system of claim 1, further comprising one or more customization controls that facilitate personalizing the display of the text data or the calendar grid according to user preferences.

9. The calendar system of claim 1, wherein:
    the event space comprises a writable surface that comprises at least one handwriting recognition component to facilitate displaying handwritten data as the handwritten data is written on the writeable surface; and
    the handwritten data forms a particular calendar item through a user clicking on a selected day of the calendar grid.

10. The calendar system of claim 9, further comprising an event options window that allows a recurring event to be set for creating multiple calendar items corresponding to a single instance of the handwritten data by clicking on one or more additional days of the selected calendar.

11. The calendar system of claim 1, wherein the changes area further includes an indication of types of actions taken to effectuate the changes in the calendar items listed in the changes area.

12. A digital calendar system comprising one or more computers configured with:
    a data input component that receives text data corresponding to one or more calendar items for displaying the one or more calendar items in a calendar grid;
    a display component that recognizes a word entered as part of the text data during creation of a particular calendar item, the display component automatically associating a color with the particular calendar item, the color being automatically selected from among a plurality of available colors based on learned user behavior associated with the recognized word, the selected color being displayed in association with the particular calendar item in the calendar grid, the learned user behavior comprising a user previously associating the selected color with one or more previous calendar items having text data including the recognized word; and
    an item optimization component that enlarges days in the calendar grid having a predetermined number of calendar items and that shrinks days in the calendar grid having fewer than the predetermined number of calendar items to maintain spatial integrity of the calendar grid.

13. The system of claim 12, further comprising:

a tracking component that records changes to the one or more calendar items made by one or more users; and the display component displaying a changes area distinct from a display of the calendar grid, the changes area displaying a history of the changes made to the one or more calendar items, the display component highlighting a changed calendar item in the calendar grid when an edited calendar item in the changes area is selected.

14. A method that facilitates managing and organizing data on a digital calendar, the method comprising using one or more processors to perform the following computer-executable acts:

receiving data input;

displaying the data input on a calendar grid in the digital calendar based in part on content of the data input to optimize visibility of such data input; and optimizing, by the one or more processors, at least one of a size or placement of a first calendar item corresponding to the data input on at least one day on a calendar grid, the optimizing based in part on available space on the at least one day in the calendar grid relative to one or more second calendar items displayed in the calendar grid for that day, the optimizing further being based on an identity of a first user corresponding to the first calendar item, and an identity of a second user corresponding to the one or more second calendar items, out of a plurality of users of the digital calendar, such that the optimizing the at least one of size or placement gives precedence to the first calendar item corresponding to the first user over the one or more second calendar items corresponding to the second user.

15. The method of claim 14 further comprising:

tracking changes made to the data input to facilitate managing access control of the digital calendar; and displaying the changes to the data input in a changes area.

16. The method of claim 14, further comprising:

recognizing a word entered as part of the data input during creation of the first calendar item; and automatically selecting a color associated with the first calendar item from among a plurality of available colors based on the recognizing the word and learned user behavior corresponding to the word.

17. A computerized appliance comprising a display space having a surface at least a portion of which is writable, the display space to present a user interface including:

an event space able to receive data input by way of multiple selectable input tools, including a writing tool and a typing tool;

a calendar space having a calendar grid to display events recorded in the event space; and a change history space displayed distinct from and concurrently with the calendar grid, calendar items that have been one of added, moved, deleted, edited or otherwise modified in the calendar grid by a first user being viewable in the change history space by a second user, the selection of an edited calendar item displayed in the change history space causing a corresponding changed calendar item in the calendar grid to be highlighted on the calendar grid in response to the selection of the edited calendar item displayed in the change history space.

18. The computerized appliance according to claim 17, wherein:

a word entered as part of the data input is recognized during creation of a calendar item; and a color associated with the calendar item is automatically selected from among a plurality of available colors based on the recognized word.

19. The computerized appliance according to claim 17, wherein the user interface optimizes at least one of a size or placement of a calendar item corresponding to the data input on at least one day on a calendar grid based in part on available space on the at least one day in the calendar grid relative to other calendar items for that day, the optimizing taking into consideration an identity of a particular user corresponding to the calendar item out of a plurality of users when optimizing the at least one of size or placement.

* * * * *